(12) United States Patent
Kolodziej

(10) Patent No.: US 8,028,391 B2
(45) Date of Patent: Oct. 4, 2011

(54) BELT LACING APPARATUS

(75) Inventor: James M. Kolodziej, Dorr, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 1396 days.

(21) Appl. No.: 11/442,037

(22) Filed: May 26, 2006

(65) Prior Publication Data
US 2007/0271754 A1    Nov. 29, 2007

(51) Int. Cl.
B23P 11/00    (2006.01)
(52) U.S. Cl. ........... 29/243.51; 29/782; 29/809; 29/819; 29/432.1; 24/31 R; 24/34; 156/137
(58) Field of Classification Search .............. 29/243.51, 29/779, 782, 788, 796, 809, 819, 432.1; 24/31 R, 24/34; 156/137
See application file for complete search history.

(56) References Cited

U.S. PATENT DOCUMENTS

| | | | |
|---|---|---|---|
| 1,710,894 A | | 4/1929 | Purple |
| 1,740,959 A | * | 12/1929 | Purple ........................ 29/243.51 |
| 2,255,855 A | * | 9/1941 | Matthaei .................... 29/243.51 |
| 3,044,074 A | * | 7/1962 | Tebb et al. ...................... 72/406 |
| 3,588,994 A | * | 6/1971 | Parenti ....................... 29/243.51 |
| 3,686,738 A | * | 8/1972 | Thomson .................... 29/243.51 |
| 4,440,336 A | * | 4/1984 | Kifor ................................ 227/4 |
| 5,020,209 A | * | 6/1991 | Fullard et al. ................. 29/564.8 |
| 5,170,924 A | * | 12/1992 | Musil ............................. 227/111 |
| 5,544,801 A | * | 8/1996 | Schick .......................... 227/110 |
| 6,081,995 A | * | 7/2000 | Herold ............................ 29/798 |
| 7,568,269 B2 | * | 8/2009 | Atkins et al. ............... 29/243.51 |

FOREIGN PATENT DOCUMENTS

GB    2 202 605 A    9/1988

OTHER PUBLICATIONS

Extended European search report issued in the counterpart European Application No. 07 75 9252 dated Feb. 28, 2011 (8 pages).

* cited by examiner

*Primary Examiner* — Derris H Banks
*Assistant Examiner* — Jeffrey Carley
(74) *Attorney, Agent, or Firm* — Fitch Even Tabin & Flannery

(57) ABSTRACT

A belt lacer uses a power drive carriage for clinching hook or C-shaped belt lacing elements to a belt end. Optionally, the carriage may be driven in a manual mode or a power mode. A detachable power drive such as from an electric drill may be used for the power mode. The power drive of the carriage may be stopped short of an end wall and a return mechanism may return the carriage to the power drive. A moveable belt support in a hand space position allows for working on the lacing elements and may be shifted to a belt supporting position. The belt clamp exerts a forwardly directed force on the belt as it is being clamped. Face plates or combs may be stored on the belt lacer. A latch secures the face plates against lateral sliding during clinching by clinching rollers on the carriage.

19 Claims, 13 Drawing Sheets

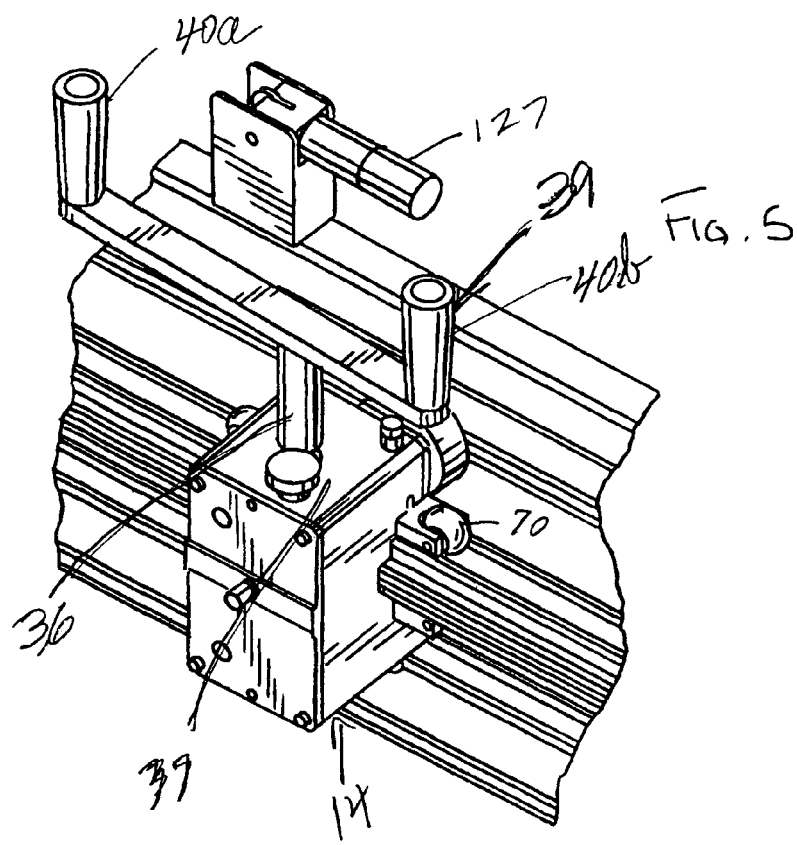
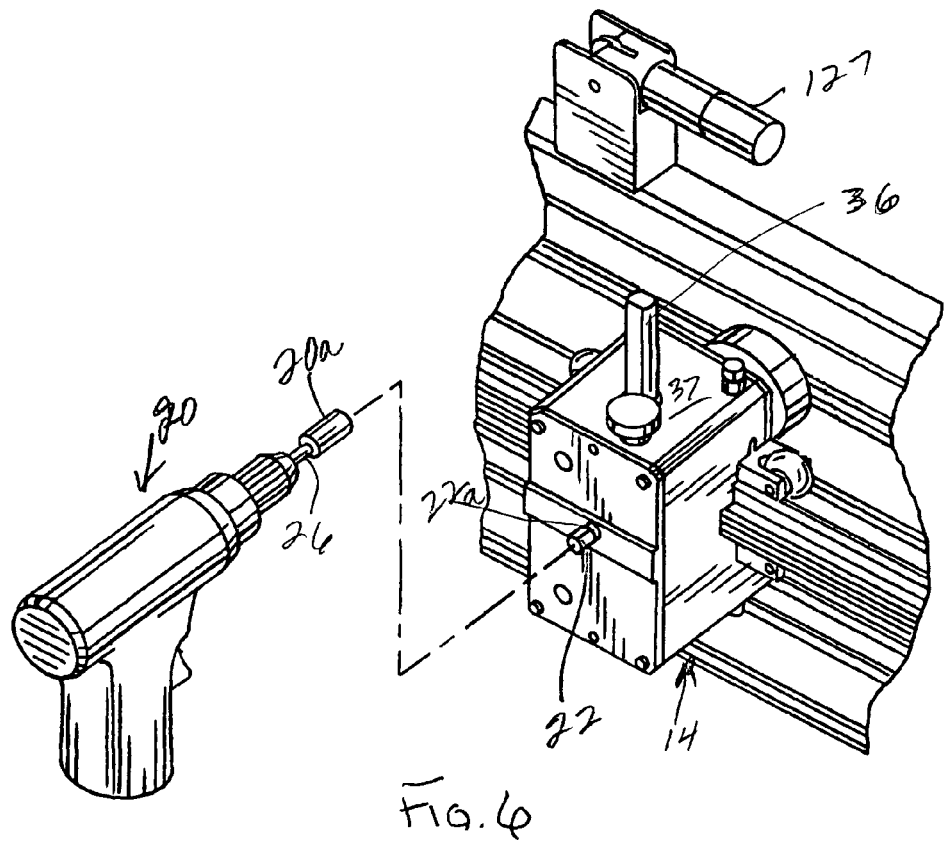

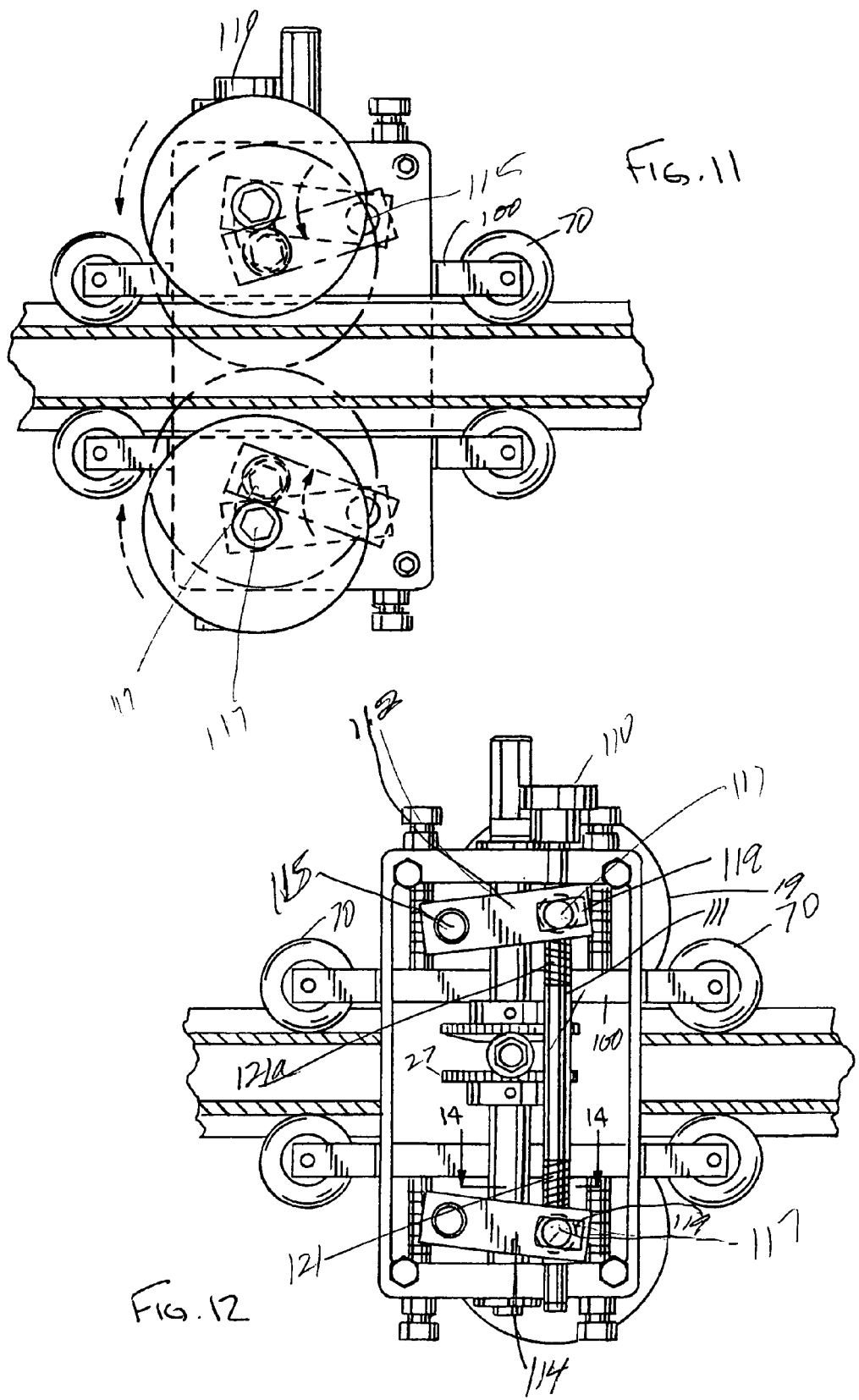

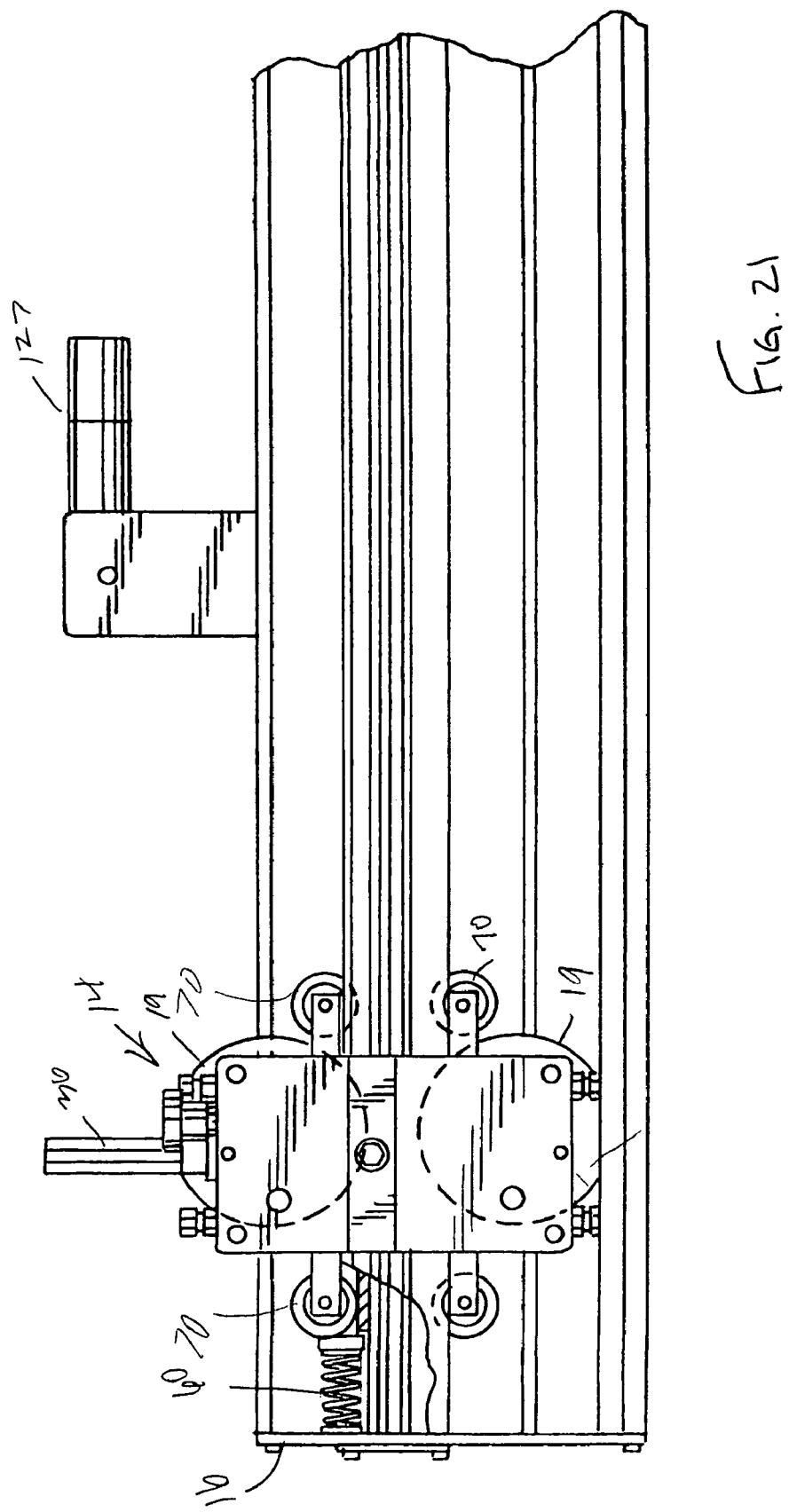

BELT LACING APPARATUS

FIELD OF THE INVENTION

The present invention relates to belt-lacing machines for clinching hook or C-shaped belt fasteners to a belt end.

BACKGROUND OF THE INVENTION

A widely used, lightweight, easily portable, belt lacing machine, hereinafter called belt lacer, is disclosed in U.S. Pat. No. 5,020,209 and is assigned to the assignee of this application. Belt lacers of this kind are frequently lighter, more compact and more easily operable apparatus than the stand-alone belt-fastener devices with larger bases and frames. The belt lacer described in the aforesaid patent utilizes a reciprocal carriage carrying a pair of clinching rollers that are operable along a secured belt end, which belt end is maintained in this position during the application of belt fasteners thereto. The belt fasteners are typical wire, open-jaw, C-shaped belt lacing elements, each of which has opposed pointed jaw ends, which are pressed into the conveyor belt end to form a U-shaped clamp with an eyelet to receive a coupling hinge pin for mating with similar belt lacing elements secured to the opposite end of the conveyor belt and for subsequent coupling by a hinge pin inserted through the mated eyelets. In the belt-lacing machine disclosed in this patent, the clinching rollers are held in a roller-head assembly or carriage and the gap or distance at the nip defined between the roller peripheries is adjustable to provide for variations in belt thickness, and more importantly, to provide the user with the opportunity to control the depth to which the pointed ends of the fasteners are progressively pressed into the belt in each of a series of clinching passes. That is, several roller passes or reciprocations are usually used to sink the pointed ends into the belt to the desired depth to secure and clinch the fasteners in the belt end. Sometimes as many as eight to ten passes are used to fully clinch the belt lacing elements to a belt end.

The belt lacer described in U.S. Pat. No. 5,020,209 uses a manually operated crank which is turned by an operator to turn a sprocket on the carriage to move along a chain drive to traverse the carriage and to roll the clinching rollers to push the hook ends deeper into the belt. The clinching rollers are adjustably mounted in the carriage and, with turning of a knob on the carriage, the clinching rollers are shifted toward or from one another to vary the gap separation between the roller circumferences to accommodate varying belt thicknesses and incrementally change the gap during fastener clinching. One or more interchangeable combs or face plates are used for different sizes of the same fastener or for different shapes of fasteners The above-described belt lacer is compact and lightweight for portability, are useful in remote locations including on-the-job sites, and find particular application in field-like operations. Therefore, portability and ease of use are vital characteristics for a roller lacer, which is utilized in a remote location, or removed from a permanent location.

To this end the frame and other members may be made of aluminum or other lightweight materials. Often a belt splice or repair is made in the field by maintenance personnel who have access to a number of motor drives such as electric motor driven drills or pneumatic motor drives. There is a need to accomplish this field repair in a quicker and easier manner than heretofore afforded by the above-described prior art belt lacer.

SUMMARY OF THE INVENTION

In the embodiment illustrated herein, the belt lacer is provided with a motor drive for the carriage for driving the carriage and for moving the belt fastener squeezing elements such as the belt clinch rollers across the belt fasteners to drive the pointed ends into the belt end as the motor drive propels the carriage along. Preferably the motor drive is faster than a manual drive. For example, the preferred travel speed of the carriage may be increased to be about four or five times faster than the usual manual drive speed used in the aforesaid patented belt lacer. Herein, the illustrated motor drive for the carriage includes a speed reducer such as a gear reduction drive that receives a high speed rotational input from a rotating motor, such as an electric motor drill or a pneumatic drive, and the speed reducer results in a slower linear speed drive for the carriage during the passes than otherwise would be provided without the speed reduction.

In accordance with the illustrated embodiment, the belt lacer may be also provided with manual mode of operation in which the carriage is driven by a manual input force such as a hand crank such as described in the aforementioned patent in addition to the power mode in which the carriage is driven by a motor drive. Although a common input shaft could be provided for turning by either a manual crank or the like as well as by a motor drive such as the electric drill, it is preferred to have separate inputs with the manual drive being operable by a crank at one location on the clinching carriage and with the power drive being operable at a second location on the carriage assembly.

In this illustrated embodiment, a rotating sprocket on the carriage is meshed with a chain and the sprocket is rotated to shift the carriage laterally along the chain which extends longitudinally along the belt end. This sprocket and chain drive propels the carriage both in the forward and the reverse directions of linear travel. In order to prevent the carriage from forceful banging into an end wall under power and result in a situation where a person's fingers or hands could be pinched between the end wall of the belt lacer and the carriage adjacent the end wall, the carriage drive terminates short of the end wall and a return device or dampening device is used to stop the carriage travel in its direction of prior to reaching the end wall. Herein, the chain in the frame has a return sprocket of a shortened distance to disconnect from the rotating sprocket as the carriage approaches the end wall. One advantage of disconnecting the drive at the end of the carriage travel is that when a hand held drill is providing the motor force, the drill motor may continue to rotate the sprocket gear without imparting a twisting motion to the drill which could turn the drill in the user's hand and injure the user's hand.

In accordance with a further aspect, the belt lacer may be provided with a device having a latch for securing the face strip or comb for a line of belt fasteners in position and to latch the strip positively against shifting laterally within the belt lacer due to the force of a motor drive on the face strip. During clinching, the rollers engage each of the belt lacing elements and exert a force component that tends to push the face strip longitudinally in the direction of travel of the carriage. The motor driven carriage and rollers provides sufficient force to push the entire face place holding the belt lacing elements from its original position unless and the face plate is latched by pivoted latches at the opposite ends to prevent shifting of the face plate in the preferred embodiment.

In the patented belt lacer, a large space is provided between the frame extrusion supporting the belt end and the face strip for allowing the user sufficient hand room to place or align the belt lacer elements within the comb-like face plate. The belt end may be wide and bend into this hand space making it more difficult to feed the belt into the gap between the pointed, belt-penetrating ends of the lacing elements. This problem is solved in the illustrated embodiments by providing a moveable support or shelf which is moveable between a supporting position for supporting the belt and an out-of-the-way position to provide the desired space needed for placing the card of belt lacing elements into the comb-like face plate on the belt lacer. Herein, in this illustrated embodiment the moveable belt support is a pivoted shelf which extends from the main stationary belt supporting portion of the frame and which can be by simple lifted or pivoted between the out-of-the-way position and the belt supporting position in a quick and efficient matter. Preferably, a keyhole lock cooperates with a pivot pin or bar to hold the shelf in the raised belt supporting position The belt should be clamped with a good clamping force to the frame or belt supporter of the lacer by a clamp which preferably imparts a force or component of a force to push and urge the belt into the space formed between the opposed hook ends of the clinching elements. Herein this is achieved by providing the belt clamp with a lower forward end which is projecting downwardly relative to a rearward end of the belt clamping surface. Thus, the forward clamp end first engages the belt and then the clamp automatically pivots to exert a force component urging the belt forwardly between the hooked ends of the belt lacing elements while the rearward end of the belt clamp is also brought into clamping engagement with the belt. Preferably, the forward, lower surface and rearward surface define a slanted surface on the lower end of the belt clamping member that provides a simple and effective clamp. Herein, the clamp is an unbalanced clamp that pivots automatically as the clamping pressure is being applied to the belt.

According to another aspect, the belt lacer is made relatively versatile in that it may be used with different face plates which are sized for different sizes of belt fasteners for different thicknesses of belts and for differently lengths of belts. In the illustrated embodiment, the belt lacer is provided with an elongated holder or storage for holding and/or storing a plurality of face plates on the belt lacer itself. The preferred holder or storage for such face plates includes a hollow elongated channel member of the belt lacer frame. While the elongated face plate members may be disposed within the hollow chamber in a number of manners, it is preferred to have the face plates longitudinally slidable along and held against the wall on the interior of the hollow channel tube between a pair of parallel, spaced ribs each formed integrally on an interior side wall of the channel. These spaced ribs guide the longitudinal sliding of face plates or combs into or from the hollow chamber.

In the patented belt lacer, slide blocks fastened to the sides were used to guide the roller carriage for straight line travel. In this embodiment, sliding friction may be reduced and greater stability provided for the carriage by having guide rollers slideable in guide channels and greater stability by having the guide rollers located at outboard positions that is spaced outwardly of the sides of the carriage.

BRIEF DESCRIPTION OF THE DRAWINGS

FIG. 5 is a perspective view illustrating a manual input in the form of a crank or handle for driving the carriage manually;

FIG. 6 is a perspective view illustrating a drive by a detachable motor for the carriage in the form of an electric motor drill for driving the carriage;

FIG. 11 is a side elevational view showing the clinching rollers being adjustably moveable to incrementally increase the penetration of the hook ends of the belt lacing elements into the belt;

FIG. 12 is an interior, side elevational view of the mechanism for moving the clinching rollers toward or away from one another with the turning of a knob;

FIG. 21 shows the carriage being returned and in a non-driving relationship with the chain drive.

DETAILED DESCRIPTION OF THE PREFERRED EMBODIMENT

Figure 1:
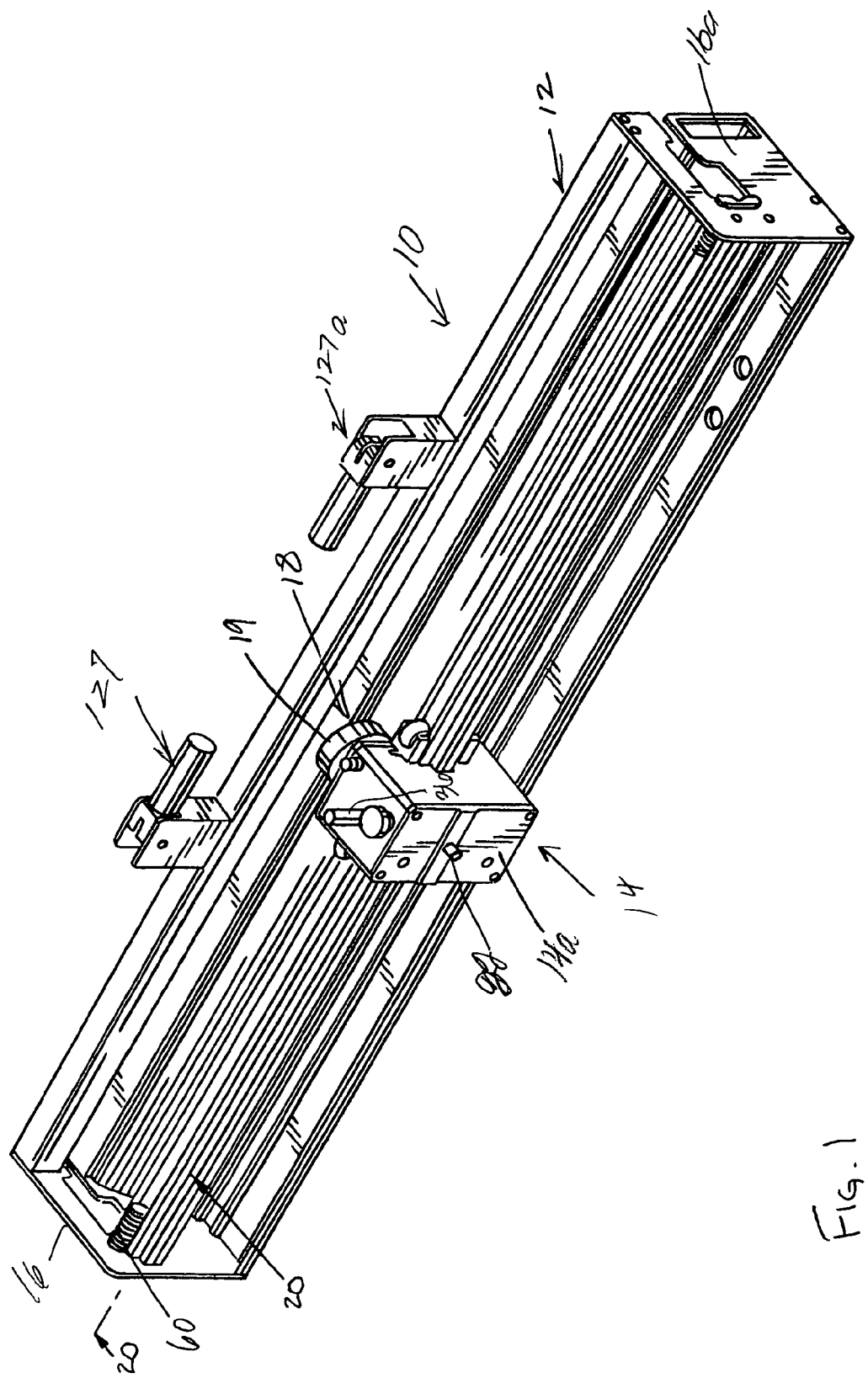
FIG. 1 is a perspective view of a belt lacer constructed in accordance with an illustrated embodiment.
Figure 2:
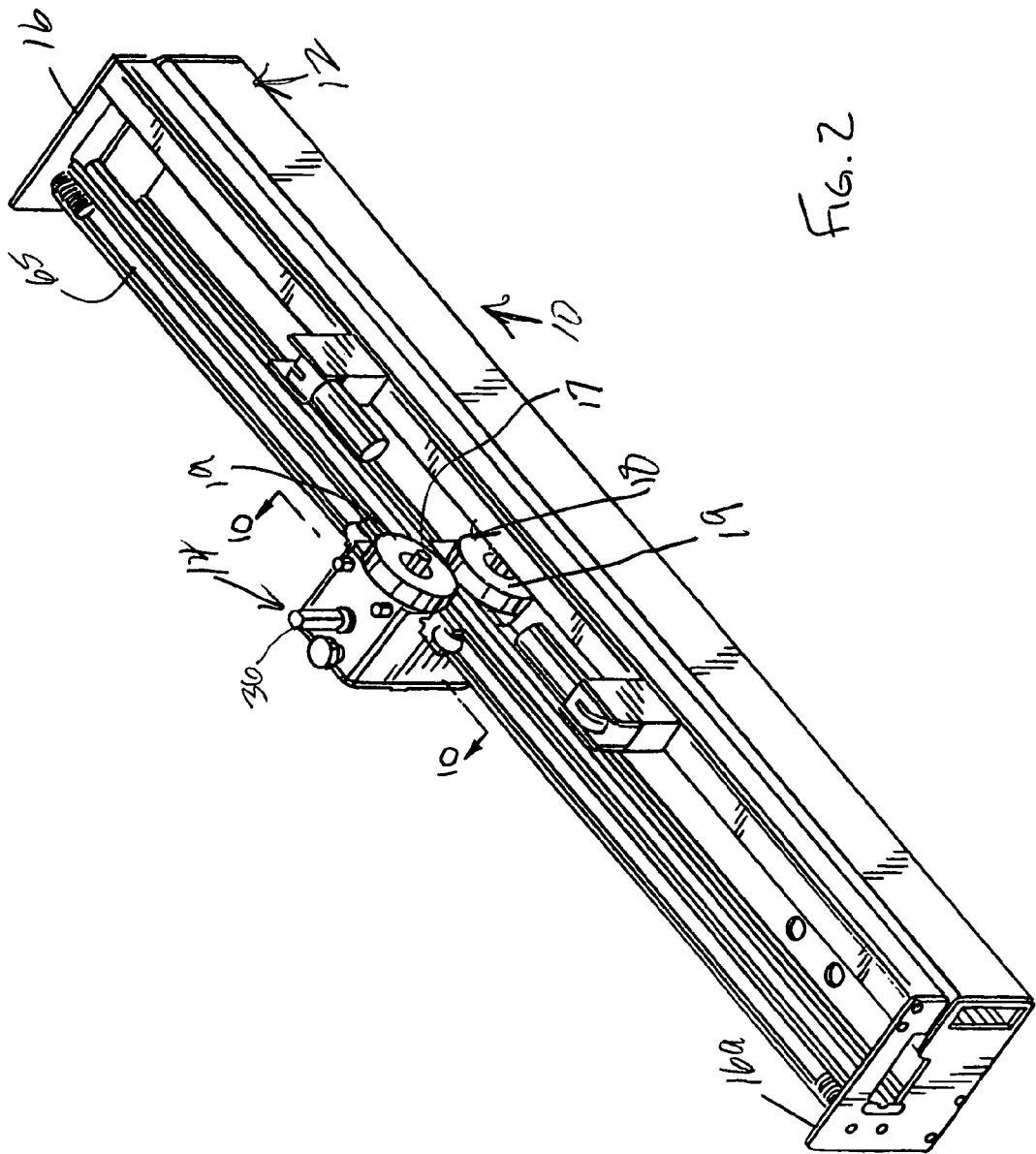
FIG. 2 is another perspective view showing the clinching rollers in position to clinch clinching elements as the carriage travels along the belt end.

As shown in the drawings and in particular with reference to FIGS. 1 and 2, a belt lacer 10 has an overall general appearance similar to that of the belt lacer disclosed in U.S. Pat. No. 5,020,209 and, hence, common elements such as frame 12 and frame extrusions or the like disclosed therein will not be repeated herein. Mounted on the frame 12 is a clinching carriage or head 14 which is adapted to be shifted along the frame and has clinching elements 18 thereon for pushing hook or pointed ends of the lacing elements into the end of the belt 15. Rather than a drill, a motor could be attached to the carriage, but this makes the belt clincher heavier and more costly. Maintenance people usually have a portable, powered drill available to them and this is the recommended manner of powering the carriage. The carriage is mounted for forward and rearward linear travel between end walls 16 and 16a of the carriage frame or support. Herein, the illustrated clinching members 18 are in the form of a pair of upper and lower clinching rollers 19 mounted on axels 17 to roll along the top and bottom surfaces of the opposed hooked ends to push these hook ends deeper into the belt end in a manner similar to that described in the aforementioned patent.

Figure 3:
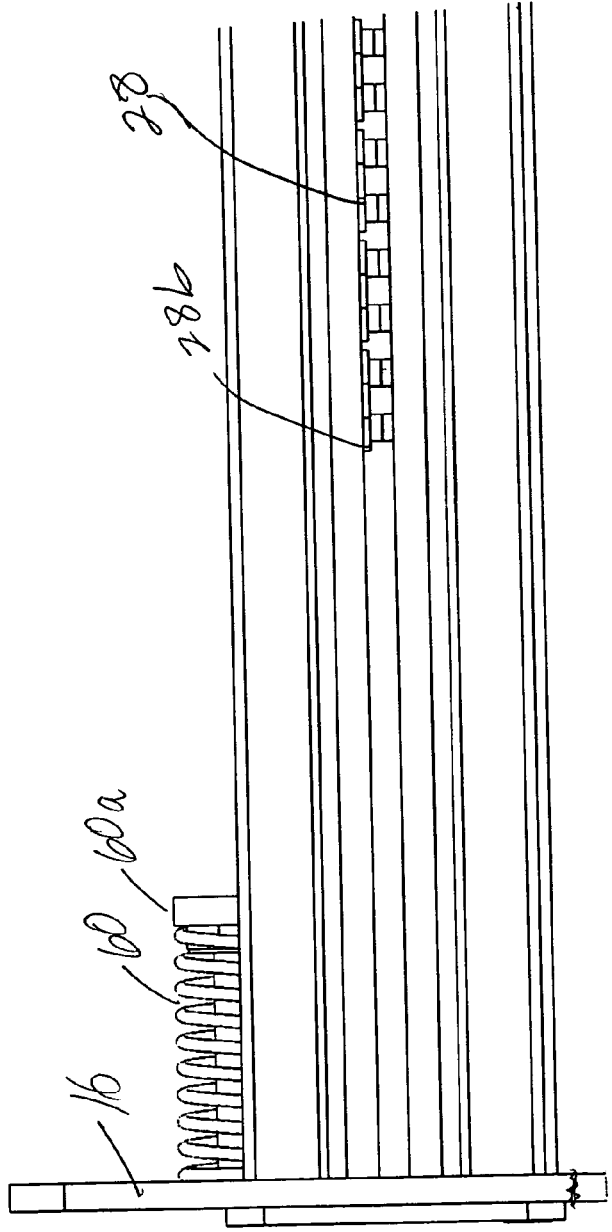
FIG. 3 is a side view showing a shortened chain drive and a return device for the carriage.
Figure 4:
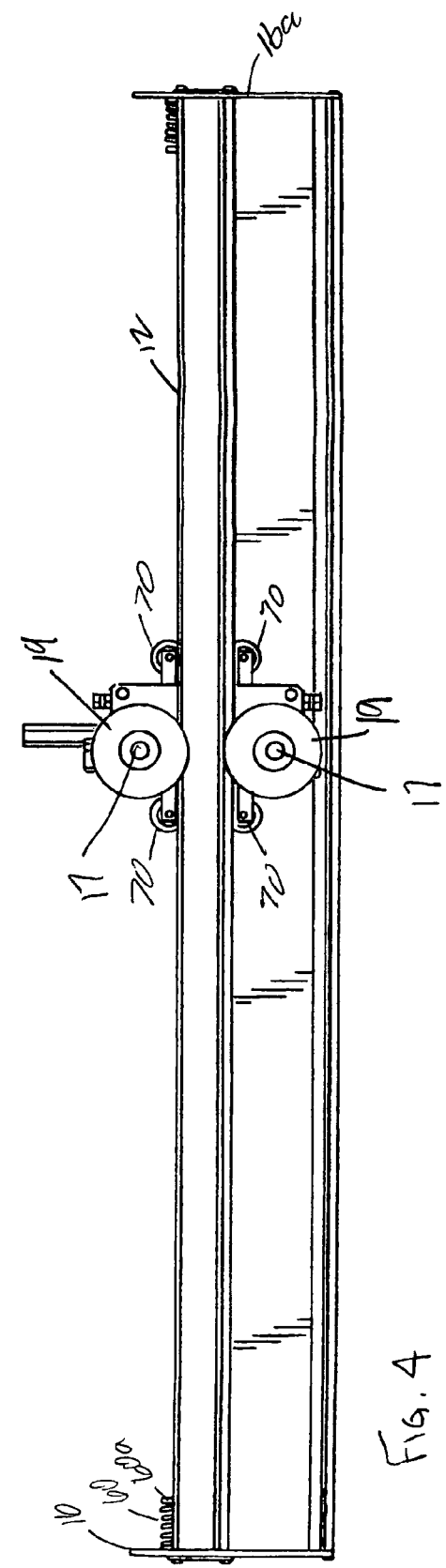
FIG. 4 is a side-elevational view similar to FIG. 3.

In accordance with the preferred embodiment, such as shown in FIG. 6, the carriage 14 is adapted to be motor driven by a motor 20 which provides a motor drive for rotating a carriage drive input 22 which is on the carriage. The input 22 is illustrated as a shaft 22a end extending exteriorly of a vertical side wall 24 of the carriage and has a configured end, such as a hex shape (FIG. 15) to mate with a hex-shaped socket 20a mounted on driving end 26 on the motor drive which is illustrated as being in the form of an electric drill having a battery pack or the like for supplying the rotational input torque to drive the motor drive input 22 for the carriage. As known in the prior art and as described in the aforementioned patent, the carriage drive comprises a drive gear or sprocket 27 (FIG. 16) which is meshed with an elongated chain 28 (FIG. 3), as described in the aforementioned patent. The chain drive extends generally longitudinally of the belt lacer and the rotatable sprocket 27 is meshed with and is rotated to travel along the chain in a known manner to propel the carriage.

In the preferred embodiment illustrated in FIGS. 5 and 6, there is also a manual mode of operation in which there is a manual drive in the form of a manual input shaft 36 which extends above a top wall 37 of the roller carriage 14 and receives a manual input such as from the handle or crank 39 as shown in FIG. 5 which also has a detachable connection to the upstanding manual input shaft 36, as shown in FIG. 6 where the crank is detached from the input shaft 36. Herein the manual drive crank 39 has a pair of upstanding hand grips 40a and 40b which are disposed at different distances from the rotational axis of the crank and the input shaft 36 to give a mechanical advantage when rotating the longer arm crank for the manually operated handle 40. Thus, it will be seen that the carriage assembly may be optionally driven by either use of the manual drive mode using the manual input force such as shown in FIG. 5 for using a motor drive input force such as shown and described in connection with FIG. 6.

Figure 15:
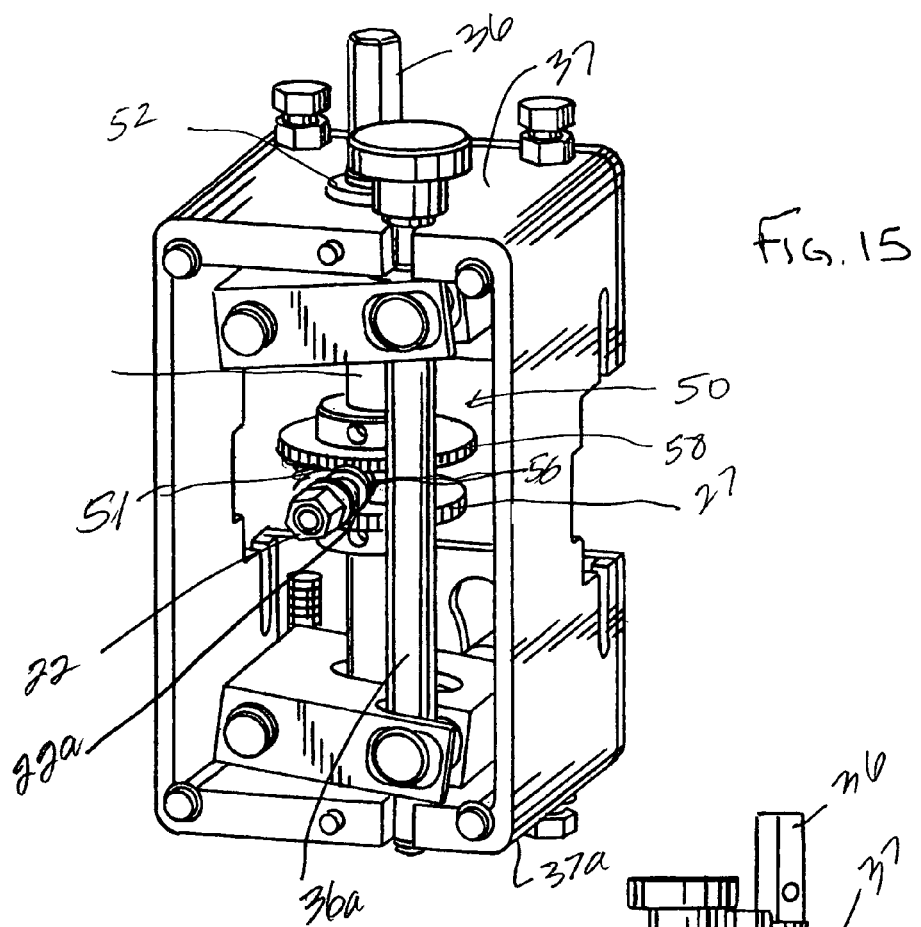
FIG. 15 shows the interior of the clinching carriage having a gear reduction device for receiving a power input from a horizontally, extending shaft.
Figure 16:
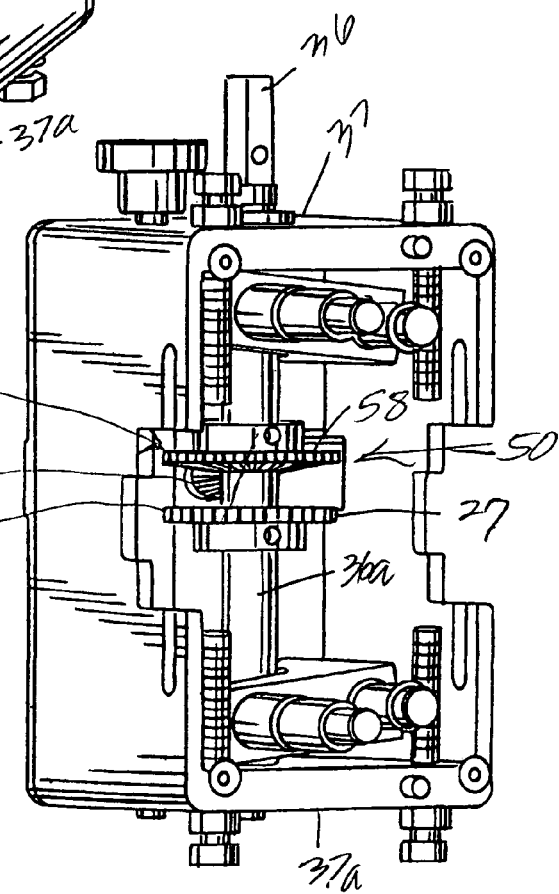
FIG. 16 is a side elevational view of the gear reduction mechanism and chain drive sprocket.
Figure 17:
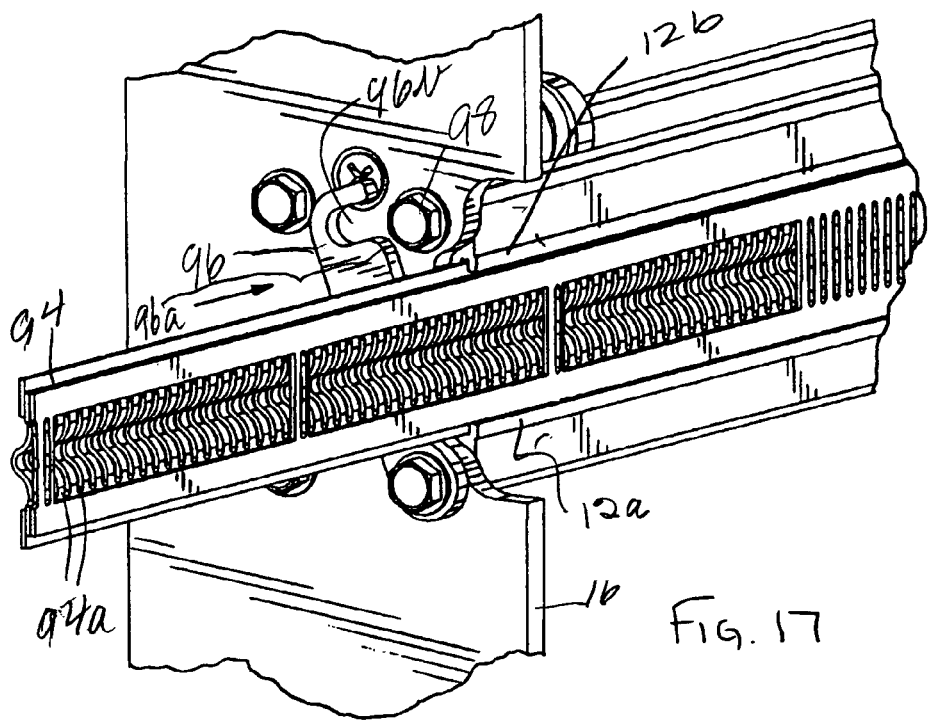
FIG. 17 is a perspective view of the latch mechanism during insertion of a face plate into the belt lacer.

It would be appreciated that the usual electric drill usually operates at a relatively high rotational speed and hence it is preferred to use a speed reduction device 50 which this instance is in the form of a gear reduction mechanism 51 as shown in FIGS. 15 and 16 in greater detail. As in the aforementioned patent, the manual drive is preferably a straight through shaft 36a which extends in the vertical direction between the top plate 37 and lower plate 37a of the housing for the carriage and is journaled for rotation at an upper and lower ends by bearings 52. The upper end 36 of the shaft 36a receives a direct drive from the manual input to rotate the shaft 36a and the attached sprocket 27 which is meshed with the chain 28. Herein, the sprocket 27 is fastened to the drive shaft 36a at a location centrally of the carriage 14.

The faster drive from the drill motor is reduced in speed to provide a four to five times greater travel speed when the roller carriage 14 is being power driven than when it is being driven by the manual rotation of the vertical shaft 36a. The horizontal input motor driven shaft 22 of the motor drive (FIG. 6) is journaled in a vertical side wall and rotation and carries a small beveled drive gear 56 (FIGS. 15 and 16) which in turn is meshed with a larger diameter gear 58 which is also fastened to the vertical drive shaft 36a. The gear ratio afforded by the gears 56 and 58 is such that the desired number of rotations of the beveled drive gear 56 results in one rotation of the driven gear 58. The actual significant reduction in speed is that which is desired for the linear travel speed for the carriage using a power drill. Manifestly, other speed reducer mechanisms may be used other than the gear mechanism illustrated and described herein and other amounts of speed reduction may be provided from that described herein.

When the carriage 14 is being motor driven, it travels at the faster speed; and it is preferred to disconnect the power drive from the carriage so that the carriage does not bang or slam into an end wall 16 or 16a and damage the end wall or cause the drill to twist in the hand of the user as may injure the person. The preferred manner of disconnecting could be obtained with a slip clutch, but, herein, the length of the drive chain 28 (FIG. 3) is shortened at each end 28a and 28b of the chain and the drive sprocket 27 on the carriage over travels past one of these chain ends and disconnects from the drive sprocket from the chain. At this time, the carriage engages the return device which, in this instance, comprises a spring 60 or 60a that provides a dampening force as the spring is compressed by the carriage pushing thereon. The compressed spring then pushes the carriage back in the opposite direction to reengage the carriage drive sprocket with the adjacent end of the chain drive. Herein the ends of the chain drive are spaced from the end walls 16 and 16a such the drive sprocket on the carriage is just making a clicking noise with the last teeth of the chain without propelling the carriage further in the forward direction. The noise also alerts the operator that it is time to reverse the direction of the motor drive to drive the carriage in the opposite direction.

Figure 20:
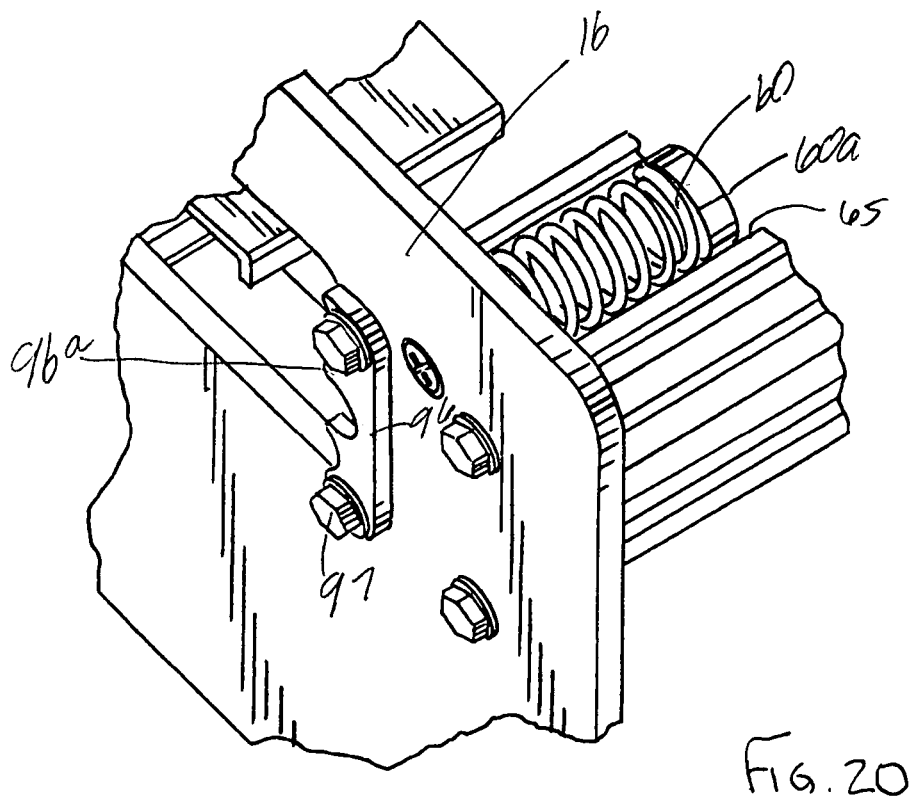
FIG. 20 is a perspective view of the latch and of a carriage return device including a resilient spring for returning the-carriage.

As best seen in FIG. 20, each of the two the return direction devices includes a coiled compression spring 60 or 60a which is coiled and has an attached head 60b which will be engaged and pushed by the carriage towards the adjacent end wall 16 or 16a thereby compressing the spring and thereafter the spring pushes the carriage in the reverse direction. More specifically, the spring head 60b will be engaged by an outboard upper wheel or roller 70 on the carriage to compress the spring 60 in one direction of travel and the other spring 60a in the other direction of travel.

Figure 10:
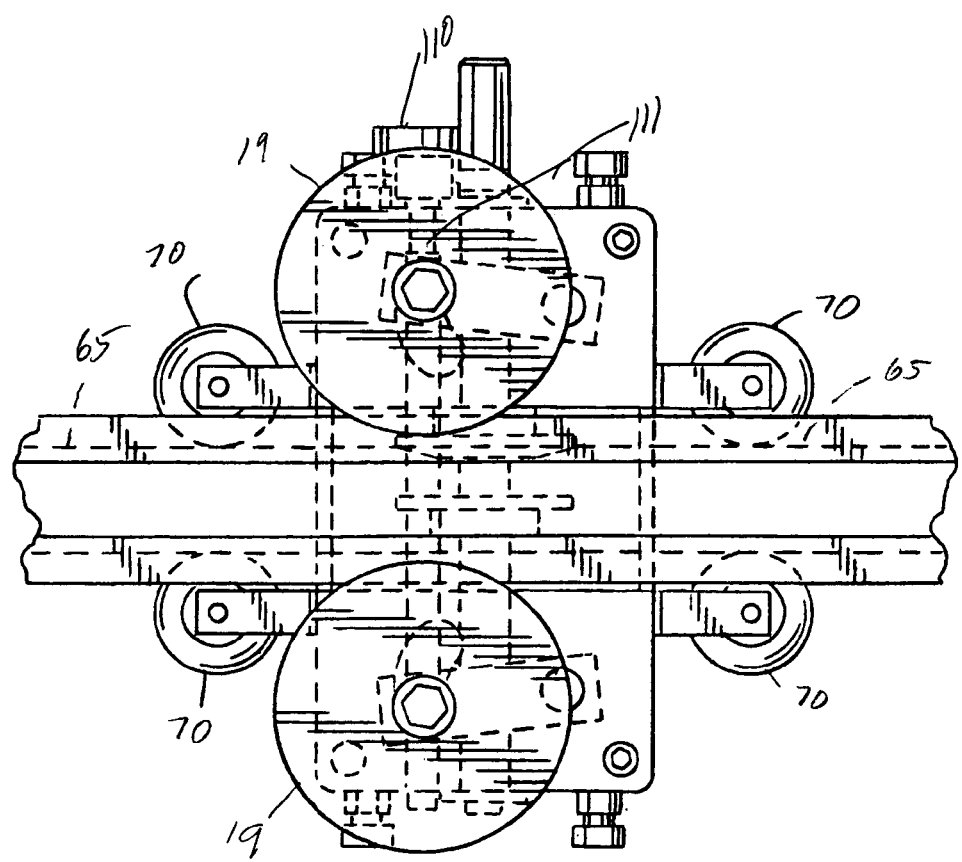
FIG. 10 is a side elevational view of the carriage having an opposed pair of clinching rollers thereon and upper and lower pairs of rollers or wheels for guiding the carriage along a straight line path.

As seen in FIG. 10, the upper outboard guide rollers 70 for the carriage 14 extend to the left and right of the carriage and the lower portion of these respective rollers roll in the same guideway or guide channel 65 that the spring is laying in. For example, as the left hand guide roller 70 nears the end of its leftward travel toward end wall 16 of the frame 12, it will abut the disk shaped head 60a fastened to the outer, free end of the compression spring which has its other end fastened to and abutting the interior side of the vertical frame end wall 16. Thus, the return devices are simple and inexpensive devices that not only dampen the carriage movement in its driven direction, but also serve to return the carriage to reengage the carriage drive sprocket and nearest end of the chain.

Figure 7:
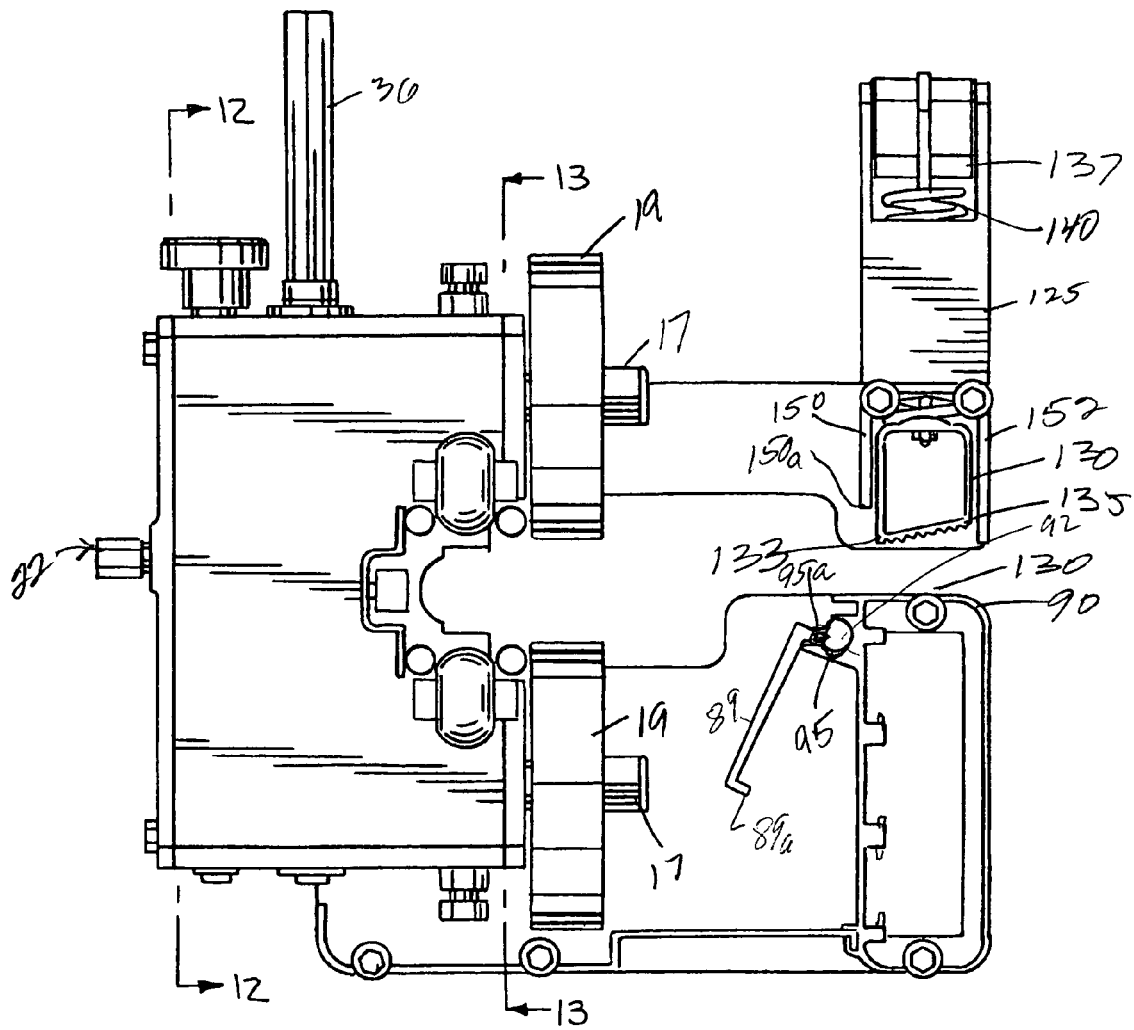
FIG. 7 is a view illustrating the clamping bar used to clamp the belt with the clamp being in its upper, non-clamping position and showing a moveable pivotable shelf in its lower out-of-the-way position.
Figure 8:
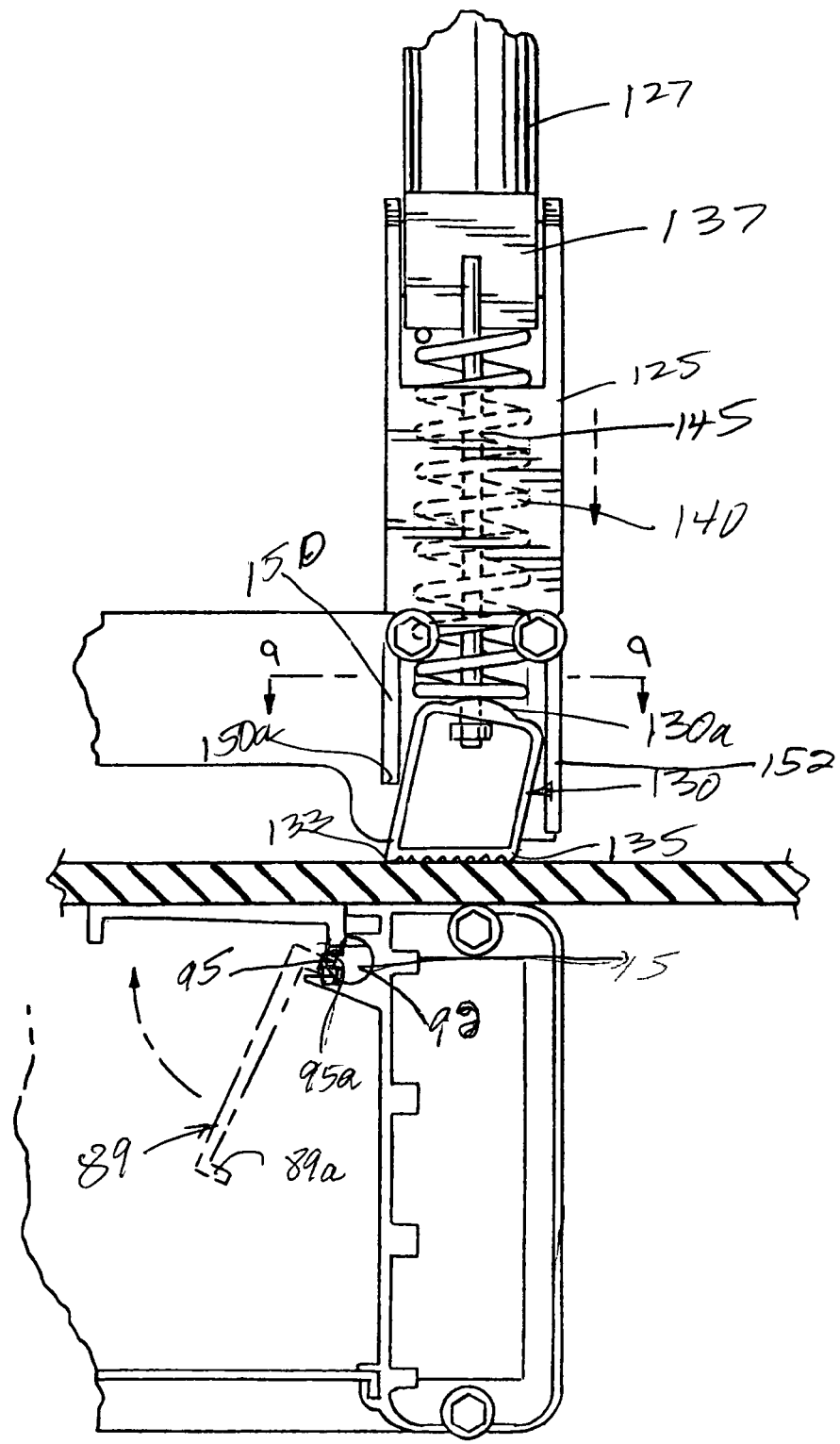
FIG. 8 is a view similar to FIG. 7 but showing the belt with the belt clamp being engaged and exerting a horizontal force component to the left to push the belt and a moveable portion such as a shelf is illustrated as being pivoted upwardly to support the belt during the belt insertion between the pointed ends of the lacing elements.

It is preferred that the belt end be supported during its insertion into the gap between the pointed ends of the belt clinching element; and to this end, the support for the belt end includes a moveable belt support portion 89 (FIG. 8) which is mounted for movement relative to a stationary portion which is the upper belt surface portion 90 on the frame extrusion. This moveable belt end support portion 89 is moveable between the belt supporting position, which is an upper position such as shown in solid lines in FIG. 8 and a dotted line out-of-the-way position shown in FIG. 8 and shown in solid lines in FIG. 7. The illustrated moveable portion 89 extends longitudinally to the main support extrusion between end walls 16 and 16a and it has a pivoted connection with the main support extrusion. This moveable portion is in the form of a pivotal shelf which extends downwardly in the out-of-the-way position from which it may be pivoted upwardly to a substantial horizontal position about a pivot rod or pin 92 fixed to one end of the shelf. The preferred shelf is an elongated, thin metal extrusion having a depending flange or lip 89a which may be gripped by the user's finger and pulled upwardly to swing the shelf about the pivot 92 to position the shelf in a horizontal position within a keyhole slot 95 which is self-locking with the shelf pivot rod, as will be explained. As the pivot rod 92 on the shelf is pulled forwardly a square projection 92a thereon is slid into and fits snugly within horizontal extending, square slot 95a portion of the keyhole 95. The square slot 95a holds the pivot rod projection 92a from rotating as would turn the shelf from the typical horizontal belt supporting position to the out-of-the-way position. When the shelf and its attached pivot rod projection 92a are pushed rearwardly from the square slot 95a in the slotted keyhole, as seen in FIGS. 7 and 8, the pivot rod is positioned in the rounded larger portion of the keyhole and the pivot rod is free to rotate with the shelf pivoting down to its out-of-the-way position.

Figure 18:
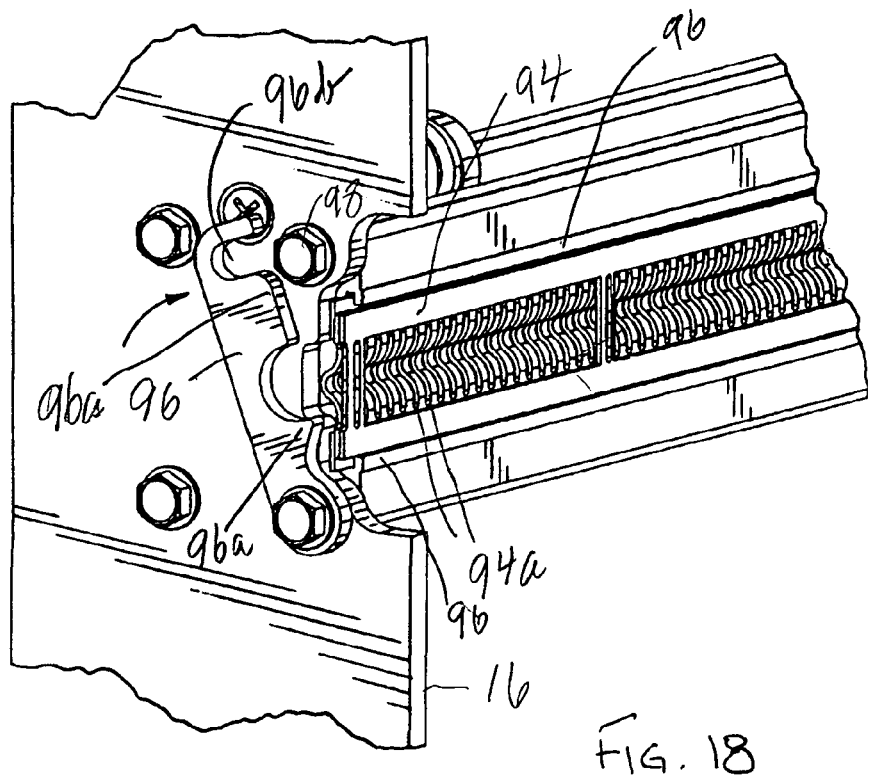
FIG. 18 is a perspective view of the latch being swung into its latching position.
Figure 19:
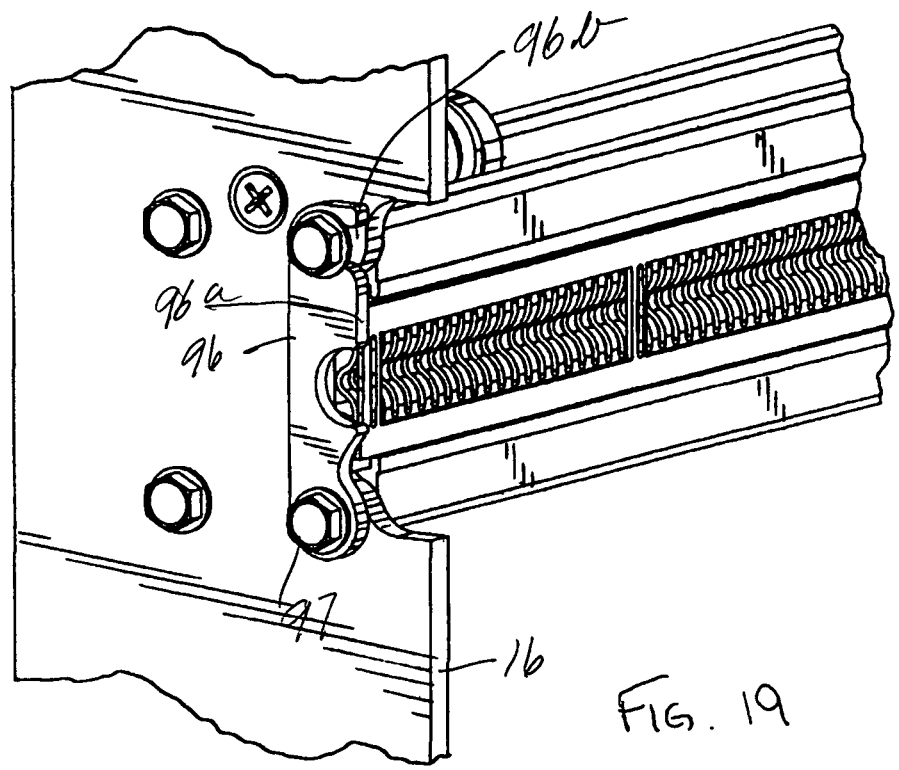
FIG. 19 is a perspective end view of the latch in position for blocking the face plate against lateral movement from forces being exerted by the motor driven carriage during the clinching operation.

As disclosed in the aforesaid patent, the belt fasteners are held in a comb or face plate 94 (FIGS. 17 and 18)with the loops of the fasteners held in slots 94a in the face plate. The face plate is a thin strip of metal with a row of slots, as best seen in FIGS. 17-20, into which are inserted each of the fastener hinge loops clinching elements of the belt clinching elements which are usually a card on which the supply of clinching elements fasteners are mounted. The paper card and the face plate holds the loops of the fasteners at fixed distances and align the fastener elements for entry into the equal spaced, vertical slots in the face plate. A gauge pin may be threaded through the loops of the belt fasteners on the face plate and the paper card is removed. After the face plate has been positioned, it is preferred to lock or latch the face plate in position against being shifted laterally in the slot formed on the extrusion. The slot is defined by integral projecting ribs 12 and 12a of the stationary extrusion of the frame 12. The ribs define a parallel groove for receiving the top and lower edges of the face plate. When the face plate has been fully inserted as shown in FIG. 18, it is then latched in position to bring a portion of the latch 96 over the ends of the face strip on each end of the travel or the end plate at opposite ends of the belt lacer. Upper and lower blocking portions 96a on the latch plate prevent the face plate from sliding to the left or right because the traveling carriage 14 and its clinching rollers 19 are exerting a horizontal force component on the clinching elements in the direction of its travel. The illustrated latch is a flat metal plate which is secured at its lower end by a bolt 97 or the like to frame end wall 16 or 16a and has a slot or groove 96b in its upper latch end which may be swung to envelop a shank of a lock screw 98 that is threaded in the end wall 16. The latch plate in its latch position acts as a block or stop when it is abutted by an end of the face plate trying to slide laterally under forces applied by the traveling carriage.

Figure 13:
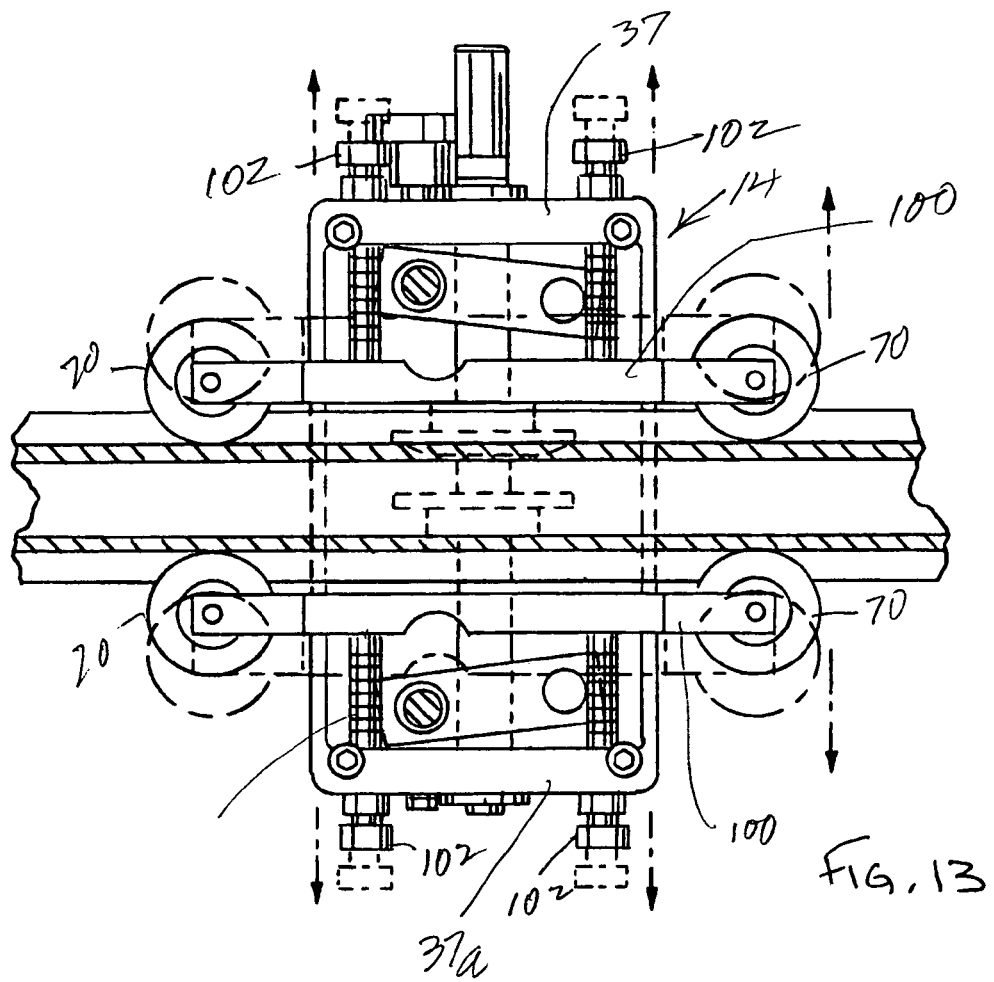
FIG. 13 is a side elevational view showing the rollers guiding the carriage being vertically adjustable.
Figure 14:
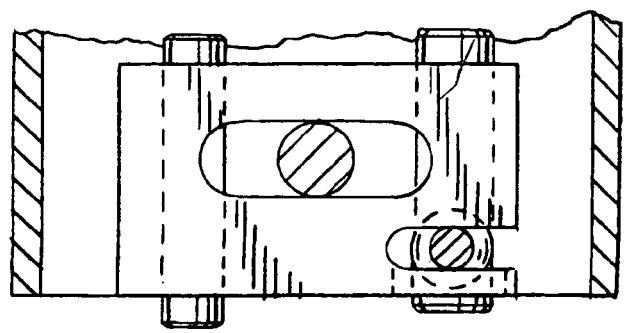
FIG. 14 is a view showing the linkage for moving the guide rollers.

As best seen in FIG. 13, the outboard carriage rollers 70 are each mounted on a horizontally extending axel bar 100 which is reciprocal in a vertical direction with the turning of adjustable screws 102 which have ends pushing against the upper and lower surface of the respective axel bars 100. The screws 102 are threaded in the top and bottom plates 37 and 37a of the carriage housing and may be shifted as shown between the solid and dotted line positions, as the rollers are lowered for providing an increase of penetration of the hooked ends of the belt lacing elements into the belt.

The adjustment of the clinching rollers 19 is achieved with a turning of a knob 110 on a vertical rotatable shaft, as shown in FIGS. 10-12, which extends vertically through a screwed connection to an end of a upper link 112 and a lower link 114. The upper link is pivoted on a pivot pin 115 for pivoting as shown in FIGS. 11 between the solid and the dotted line positions with the axels of the clinching rollers being mounted on the links as shown in FIG. 12. The threads on the knuckles 119 that are threaded onto oppositely threaded, screw thread portions 121 and 121 a on the shaft so that the turning of the shaft 111 by the knob 110 in one direction causes the pivot links carrying the rollers to pivot away from one another to increase the distance therebetween or conversely when the knob 110 is rotated in the opposite direction, the knuckles, because of their engagement with oppositely threaded screw threads on the shaft, are moved vertically toward one another. Thus, the clinching rollers on the axels to have a same movement toward or away from one another to increase or decrease the depth of pointed end penetration during the next pass.

In accordance with the preferred and illustrated embodiment, the belt is clamped with a clamping force which not only clamps the belt with a vertically directed force, but also provides and imparts a horizontal force component to push and urge the belt into the space formed between the opposed hook ends of the clinching element. The belt clamp disclosed herein is generally similar to that disclosed in the aforementioned patent in that it includes a stationary, clamp bar 125 (FIG. 7) extending generally horizontal and fixed at its opposite ends to the end plates 16 and 16a of the frame. The belt clamp is operated between its clamping position (FIG. 8) and its unclamped position (FIG. 7) by the operation of a pair of spaced, toggle handles 127 and 127a, which extend vertically upward in the non-clamping position of FIG. 7 and when pivoted to a clamping position, are horizontally extending, such as shown in FIG. 1. Within the hollow stationary clamp bar 25 is nested a moveable bar 130 which is moved into engagement with the upper surface of the belt to urge and forces the belt downwardly against a top surface 131 on the stationary frame extrusion supporting the underside of the belt as shown in FIG. 8. The upper, moveable clamp bar in this preferred embodiment is constructed to first engage the belt and automatically exert a horizontal force component urging the belt forwardly between the hooked ends of the belt lacing element. As will be explained in greater detail hereinafter, as the moveable clamping bar 130 moves down to engage the belt from the non-clamping position of FIG. 7 to the clamping position of FIG. 8, the moveable clamping bar 130 automatically pivots to exert the forwardly directed force in the forwardly directed force to the belt from and at a forward portion or corner 133 of the belt bar. The corner 133 engages first the belt and then as the clamping bar is pivoted downwardly from the unclamped position shown in FIG. 7 to the clamping position of FIG. 8, the moveable clamping bar rocks or pivots to bring a rearward surface or corner 135 of the clamp into engagement with the belt.

Figure 9:
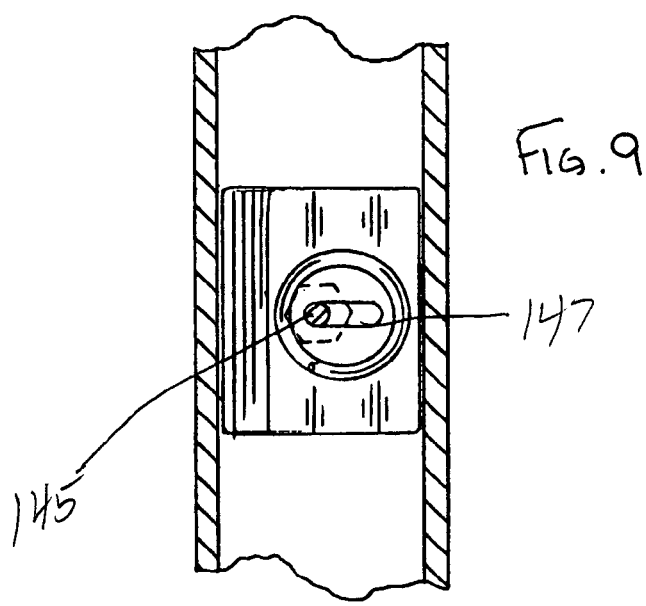
FIG. 9 shows an oblong hole which allows the pivoting of the belt clamp to engage the slanted surface on the belt clamp with the belt.

Referring now in greater detail to the illustrated construction, the moveable clamping bar 130 is moveable with the turning of the toggle clamp handles 127, 127a which are in their vertical position when the moveable clamping bar is in its unclamped position as shown in FIG. 7 to the clamp position shown in FIG. 8 with an attached toggle block 137 being operated by the handles to move downwardly within the stationary support bar 125 to compress a spring 140. The spring has its lower end engaging a top, rounded hemispherical surface 130a formed on the moveable clamping bar. In the unclamped position, the moveable clamping bar is positioned in its vertical non-pivoted position as shown in FIG. 7; and as the spring 140 is compressed, it pushes the moveable clamping bar down to engage its forward corner 133 which causes, upon further downward movement of the moveable clamping bar, the clamping bar to pivot about its forward corner. The moveable clamp bar is free to pivot about a vertically upstanding rod 145 which is secured at its upper end to the toggle block 137 and this rod extends through an oblong hole 147 (FIG. 9) in the rounded top wall of the moveable bar to a nut threaded on its lower end. The oblong slot allows this rounded top wall to swing and to pivot the lower or the rearward portion 135 of the moveable clamping bar into engagement with the belt as seen in FIG. 8. The forward or pivoting of the moveable belt bar is limited by its engagement with a lower edge 150a of a forward side wall 150 with a foreshortened end of a vertical wall on the fixed support bar 125. It will be noted that the moveable bar is mounted in a hollow channel or chamber defined by this shortened forward wall 150 and a parallel rear wall 152 which extends down to adjacent the rearward corner 135 of the moveable bar 130. Thus, it will be seen that the unbalanced, moveable clamping bar 130 is constructed to provide a forward component of force to the belt urging it toward the position where it is inserted into the gap between the pointed ends of the respective punching elements. Herein, the lower surface of the moveable clamping bar is formed with ridges or a serrated surface to assist in pushing the belt forwardly without slipping thereon. This lower surface is also a slanted surface extending from the forward corner 133 to the rear corner 135 of the moveable bar.

It will be appreciated that the belt end, support shelf feature, the storage feature for face plates, etc. may be used non-motor driven belt lacers as well as on the power driven belt lacer described herein. That is, many of these features may be used on the belt lacer described in the aforementioned patent or other non-motorized belt lacers.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. A belt lacer for clinching belt lacing elements along an end of a belt, the belt lacer comprising:
   a support configured to support the belt and the belt lacing elements during the clinching of the belt lacing elements to the belt end;
   a carriage adapted to be shifted relative to the lacing elements along the support;
   upper and lower clinching rollers mounted to the carriage adapted for clinching the belt lacing elements to the belt end; and
   a carriage drive configured to continuously shift the carriage along the support to clinch the belt lacing elements to the belt and being operable in either one of a first manual mode or a second power mode;
   wherein the carriage drive comprises a first manual drive configured to receive a manual input force for causing the carriage to be continuously shifted along the support with the upper and lower clinching rollers rolling over and past the belt lacing elements for clinching the belt lacing elements to the belt end in the first manual mode; and
   a second power drive configured to receive a motor drive force for causing the carriage to be continuously shifted along the support at a faster travel speed than in the first manual mode with the upper and lower roller clinching rollers rolling over and past the belt lacing elements for clinching the belt lacing elements to the belt end in the second power mode.

2. A belt lacer in accordance with claim 1 wherein the carriage drive comprises a common central drive assembly configured to shift the carriage relative to the belt lacing elements and the belt end;
   the first manual drive comprising a first input for operating the central drive assembly; and
   the second power drive comprising a second input configured to operate the central drive assembly to do the clinching.

3. A belt lacer in accordance with claim 1 comprising:
   a frame having an end wall at an end of carriage forward travel in a belt lacing direction;
   the carriage drive comprising a chain drive stopping short of driving the carriage into the end wall which could pinch a user's hand between the power driven carriage and the end wall; and
   a return direction device for returning the carriage back onto the chain drive for reverse return travel.

4. A belt lacer in accordance with claim 3 wherein the return direction device comprises a spring positioned on the support to be compressed by the carriage in its forward travel and exerting a force to return the carriage onto the chain drive.

5. A belt lacer in accordance with claim 1 comprising:
   a device mounted on the support and configured for securing a face strip of belt lacing elements in position on the belt lacer;
   the device having a latch mounted on the support and configured to secure the face strip in position on the belt latch.

6. A belt lacer in accordance with claim 5 where the device comprises a manual operated member positionable and configured to hold the face strip in position for the clinching; and
   the latch comprising a pivoted latch member mounted on the support and configured to pivot between a non-latching and a latching position to retain the facing strip from being forced to shift forwardly during the clinching.

7. A belt lacer in accordance with claim 1 wherein the support for the belt comprises a moveable portion mounted on a stationary portion of the support and configured to move between a belt supporting position for a clinching operation and an out of the way position to provide more space for placing the belt lacing elements in the belt lacer than available with the moveable portion in the belt supporting position.

8. A belt lacer in accordance with claim 7 wherein the moveable portion of the support comprises:
   a pivoted shelf pivotable from a substantially horizontal position to support the belt during clinching and a lowered position allowing more hand space over that available in the horizontal position; and
   a pivot pivotally connecting the pivoted shelf to the remainder of the support.

9. A belt lacer in accordance with claim 1 comprising:
   a belt clamp mounted on the support and having a portion configured to engage the belt and to push the belt end towards a mouth formed between the opposed hook ends of the clinching element.

10. A belt lacer in accordance with claim 9 wherein the belt clamp comprises:
    a moveable belt clamp member moveable to a position to engage the belt and having a clamping surface thereon pushing the belt into the mouth between the spaced hook ends.

11. A belt lacer in accordance with claim 10 wherein the surface has a lower forward end projecting downwardly relative to a rearward end of the surface with the forward, lower end first engaging the belt end and exerting a force component for pushing the belt into the mouth between the hooked ends.

12. A belt lacer in accordance with claim 11 wherein the clamp member is pivotally mounted on a pivot and pivots as the belt clamp member travels vertically to first engage the lower forward end and then the rearward end of the belt clamp surface; and the lower forward end and rearward end defining a slanted surface for a lower end of the pivoted clamping members.

13. A belt lacer in accordance with claim 1 wherein the second power drive comprises:

a gear reduction mechanism configured to reduce the linear speed of carriage travel relative to the rotational speed of the motor input and to provide the torque needed from a motor input.

14. A belt lacer in accordance with claim 13 wherein the gear reduction mechanism comprises:

a first rotatable shaft having an end configured to be attached to the manual drive; and a second drive shaft independent of the first shaft having an end configured to be attached to the motor drive.

15. A belt lacer in accordance with claim 1 comprising:

a guide surface on the support configured to guide the carriage to travel along a path parallel to the belt lacing mounted in the belt lacer; and guiding rollers mounted on the carriage to roll along the guide surface.

16. A belt lacer in accordance with claim 15 comprising:

roller supporting mounts positioned to extend outboard of the carriage; and the rollers being mounted on the roller supporting mounts to engage the guide surface at locations forwardly and rearwardly of the carriage.

17. A belt lacer in accordance with claim 1 wherein a face plate is mounted in a clinching position on the belt lacer support and receives and holds a plurality of lacing elements in a position to receive the belt end in the mouth between the hook ends of the lacing elements; and an elongated face plate holder on the belt lacer support adapted to hold another face plate to be substituted for the face plate mounted in the clinching position.

18. A belt lacer in accordance with claim 17 wherein the face plate holder comprises an elongated channel on the support to receive and hold one or more face plates.

19. A belt lacer in accordance with claim 18 wherein the elongated channel comprises a hollow tube, and parallel ribs formed on a wall of the channel and spaced to receive and hold a face plate being slid along the ribs into the interior of the channel.

\* \* \* \* \*